April 28, 1964   E. F. LINHORST   3,130,450
APPARATUS FOR MOLDING PLASTIC MATERIALS
Filed Oct. 12, 1961
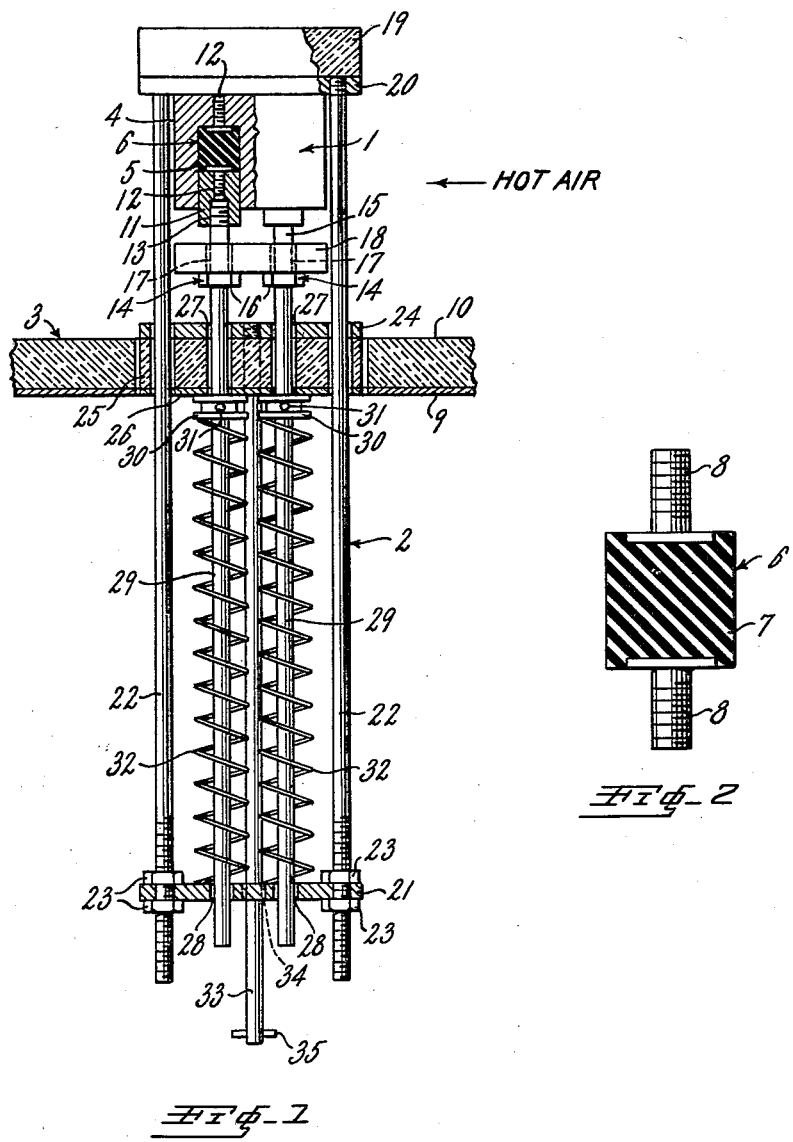
INVENTOR.
ERWIN F. LINHORST
BY
ATTORNEY

United States Patent Office 3,130,450
Patented Apr. 28, 1964

3,130,450
APPARATUS FOR MOLDING PLASTIC MATERIALS
Erwin F. Linhorst, Paterson, N.J., assignor to United
 States Rubber Company, New York, N.Y., a corporation of New Jersey
Filed Oct. 12, 1961, Ser. No. 144,676
8 Claims. (Cl. 18—16)

Rubber or rubber and metal parts, such as rubber stoppers or cylindrical machine mountings, may be molded by a variety of different processes such as compression molding or transfer molding, including "trimless" and "flashless" molding. All of these methods customarily employ heavy hydraulic presses and require steam heated platens. Also, all of these methods customarily result in an appreciable amount of waste in the form of flash, sprues, etc. Multi-cavity positive or plunger type molds, on the other hand, usually result in no appreciable flash or other waste. Such molds, however, are difficult to use in conventional molding presses, principally because of the problems encountered in applying individual, more or less equal molding forces to each plunger.

It is an object of the present invention to provide a new and improved apparatus for molding rubber and rubber-metal bonded articles or articles formed of materials presenting similar molding problems.

It is a further object of the present invention to provide a new and improved lightweight press for molding such articles.

It is a still further object of this invention to provide a new and improved plunger type mold and, in particular, one in which the plungers may be handled collectively as a single assembly while preserving their individual molding action.

Other objects and advantages of the present invention will become apparent from the following description when read in conjunction with the accompanying drawings wherein, FIG. 1 is an elevational view, partially sectioned and partially broken away, showing a multi-cavity positive mold mounted in a spring actuated press while said mold is located in the curing position in an oven.

FIG. 2 is a partially sectioned view of a typical product which may be molded in the apparatus of FIG. 1.

Referring now to the drawings, in FIG. 1 is shown a multi-cavity plunger type mold assembly 1 mounted in the spring loaded press 2, both mold 1 and press 2 are shown fully loaded in the curing position in the oven 3. In each of the cavities 5, one of which is shown in cross section, in the mold plate 4, a cylindrical rubber-metal mounting 6, comprised of a cylinder of rubber 7 bonded at each end to a threaded stud 8, has been molded and is being cured. The oven 3, which is formed of sheet metal 9 provided with internal slab type insulation 10, may be of a conventional circulating hot air type.

The multi-cavity positive mold assembly 1 includes the mold plate 4, in which are formed a plurality of mold cavities 5, each having a plunger 11 snugly fitted therein and loosely assembled as a unit on the handling plate 18. The mold depicted in FIG. 1 is a four cavity mold, although only two cavities are visible in FIG. 1. In the mold shown in FIG. 1, both the base of the mold cavity 5 and the plunger 11 are provided with holes 12 to receive the studs 8. A threaded hole 13 is provided in the end of each plunger 11 which protrudes from the mold cavity 5. Bolts 14 are threaded into these holes 13. Bolts 14 are sufficiently long to provide a substantial length of shank 15 between the plungers 11 and the heads 16 of the bolts 14. The shanks 15 of each of the bolts 14 are passed, with a substantial diametral clearance through holes 17 in handling plate 18 before the plungers 11 are assembled to the bolts 14.

Turning now to the press 2, the fixed platen 20 and the base plate 21 are held in parallel relationship at a fixed distance from each other by four support rods 22 threaded on both ends and connected to the fixed platen 20 and the base plate 21 near the respective four corners thereof. Nuts 23 permit adjustment of this fixed distance. Fixed platen 20 is surmounted by insulation block 19 which corresponds in thickness to the insulated floor of the oven 3.

Slidably mounted in holes 27 and 28 through the movable platen 24 and base plate respectively are a plurality of push rods 29 corresponding in number (in this case 4) to the number of mold cavities 5 and plungers 11 employed in the mold 1. These vertical push rods 29 are so positioned that one of them will contact each bolt head 16 when the rods 29 are advanced upwards towards the mold 1 in the press 2. Mounted on each push rod 29 is a collar member 30 fastened to the push rod 29 by means of a cotter pin 31 passing through aligned holes in both collar and push rod. These collar members 30 support the movable platen 24 with its associated insulation 25 and floor plate 26. Forcing both the collars 30 and the attached push rods 29 individually upward and providing the molding force for the press 2 are helical coil springs 32 surrounding each push rod 29. The bottom ends of the coil springs 32 bear against the base plate 21 while the top ends bear individually against the collars 30. Pull rod 33 is provided for the purpose of lowering push rods 29 in order to insert or remove the mold 1 from the press 2, the top end of pull rod 33 being attached by suitable means, such as screw threads, to the movable platen 24 while the bottom end passes slidably through a hole 34 in base plate 21. The cross pin 35 is provided through the bottom end of pull rod 33 to permit engagement by any suitable mechanical means for the purpose of lowering or retracting the push rods 29 and disengaging the mold 1 therefrom. The compression springs 32 are so selected as to exert an appropriate individual molding force upon each of the bolts 14 when the press is in its closed position as shown in FIG. 1.

The method of operation of the apparatus shown in FIG. 1 to produce the mountings, such as the one shown in FIG. 2, is as follows: In the starting or loading position of the press 2 the insulating block 19 of the fixed platen 20 is level with the oven floor insulation 10, and is held in that position by means (not shown) for supporting the base plate 21. In such position the movable platen 25 and push rods 29 are moved downward and held in the downward position by the pull rod 33, so that the mold assembly 1 which has been removed from the press 2 can be inserted in the press. In the starting or loading position of the mold assembly 1, the mold plate 4 is on a bench (not shown) with the plungers 11 removed therefrom. Studs 8 are then assembled in the holes 12 in each mold cavity 5 and plunger 11. Next, a suitably sized pre-cut "biscuit" of uncured rubber is inserted into each mold cavity 5 and the cavities 5 are closed by the plungers 11, the plungers 11 being handled as a unit assembly by means of handling plate 18. For ease in inserting plungers 11 into the mold cavities 5, it has been found desirable that the exposed shank 15 be substantially longer than the thickness of the handling plate 18, and that the plungers 11 be loosely mounted in the plate 18 by providing the clearance 17.

Next, while the press 2 is in the "down" or loading position (insulation block 19 being level with oven floor insulation 10 and push rods 29 being held in a downward retracted position) the assembled and loaded mold 1 is inserted into the press 2. Pull rod 33 is then released permitting push rods 29 to bear individually against each bolt 14, thereby molding the uncured rubber biscuit to the shape of the cavity 5 and the heads of the studs 8. Then the entire press assembly 2 is raised upwards into the oven 3 by appropriate mechanical means (not shown) to the curing position as shown in FIG. 1. A dull dark outside surface on the mold plate 4 will enhance the heat transfer from the circulating hot air of oven 3 to the mold 1 and its contents.

After the cure is completed, the press 2 is lowered from the oven 3 until the insulation block 19 is again level with the oven floor insulation 10. The base plate 21 coming to rest on a fixed support (not shown). Then the pull rod 33 is pulled downwards by an appropriate mechanical means (not shown) engaging the cross pin 35, thereby disengaging the mold plate 4 from the fixed platen 20. The mold assembly 1 may then be removed from the press 2 to a bench (not shown), the plungers 11 may be removed from the mold cavities 5 by pulling upon the handling plate 18, and the finished mountings 6 may be either pushed or pulled from the cavities 5.

While the foregoing apparatus and method have been described in terms of a four cavity mold, it should be appreciated that molds having any reasonable number of cavities may be employed, it being necessary only that each plunger be depressed into its mating mold cavity by an individual molding force exerted by the compression springs. Substantially identical apparatus has been successfully employed in connection with a 168 cavity mold.

Similarly while the foregoing description relates to the molding of rubber-metal bonded articles, it should be appreciated that the same method and apparatus may be employed in the molding of articles made of rubber alone or of other plastic materials or of plastic materials and metal provided that the molding conditions required are similar to those required for molding rubber.

While a preferred form of the invention has been shown and described, it will be appreciated that this is for the purpose of illustration and that modifications and changes may be made therein without departing from the spirit and scope of the invention.

Having thus described my invention, what I claim and desire to protect by Letters Patent is:

1. Apparatus for molding plastic materials, including rubber, comprising a multi-cavity positive mold in a press, said mold including a mold plate having a plurality of mold cavities opening on one surface thereof and a plurality of plungers, one of said plungers being insertable into each of said cavity openings, said press including a fixed platen and a base plate in fixed parallel relationship, a plurality of push rods passing through said base plate and opposing said fixed platen, each of said push rods being surrounded by helical spring means bearing against said base plate and against collar means fixedly mounted near the end of each said push rod opposed to said fixed platen, said push rods being of such number and arrangement as to cause each plunger to be pressed individually into its mating mold cavity by the force exerted upon each said push rod by said spring means, and means for simultaneously compressing all of said springs and retracting said push rods to permit the removal of said mold from said press.

2. Apparatus for molding plastic materials, comprising the combination of a press and a removable mold assembly, said assembly comprising a mold plate having a plurality of mold cavities therein, a removable plunger for each of said cavities, a handling plate on which all of said plungers are assembled for movement as a unit and for entry into said mold cavities, said press comprising means for receiving said mold assembly, and means for individually actuating said plungers.

3. Apparatus for molding plastic materials, comprising the combination of a press and a removable mold assembly, said assembly comprising a mold plate having a plurality of mold cavities therein, a removable plunger for each of said cavities, a handling plate on which all of said plungers are loosely assembled for movement as a unit and for entry into said mold cavities, said press comprising means for receiving said mold assembly, and means for individually actuating said plungers.

4. Apparatus for molding plastic materials, comprising the combination of a press and a removable mold assembly, said assembly comprising a mold plate having a plurality of mold cavities therein, a plunger for each of said cavities, a handling plate having openings therein, each of said plungers having a projection extending into one of said openings and slidably connected to said handling plate for movement as a unit and for ease of entry into said mold cavities, said press comprising means for receiving said mold assembly, and means for individually actuating said plungers.

5. An apparatus for molding plastic materials comprising a press and a removable mold assembly, said assembly comprising a mold plate having in one face a plurality of mold cavity openings, a removable plunger adapted to fit each of said openings, a handling plate having through openings therein matching said cavity openings, a projection on each of said plungers loosely fitting into each of said through openings and slidably connected to said handling plate for movement as a unit and for ease of entry into said cavity openings, said press comprising means for receiving said mold assembly, and individual spring actuated push rods for actuating said projections on said plungers and thereby exerting individual molding pressures on said plungers.

6. Apparatus for molding plastic materials, comprising the combination of a press and a removable mold assembly, said assembly comprising a mold plate having a plurality of mold cavities opening from one face thereof, a handling plate on which all of said plungers are assembled as a unit for entry into said mold cavities, said press comprising a fixed platen and spring actuated push rods between which said mold assembly is placed, each of said push rods having an end adapted to exert individual molding pressure upon a corresponding said plunger and force said mold plate against said fixed platen, and means for the withdrawal of said push rods and said mold assembly for the removal of said mold assembly.

7. Apparatus for molding plastic materials, comprising the combination of a press and a removable mold assembly, said assembly comprising a mold plate having a plurality of mold cavities opening from one face thereof, a handling plate on which all of said plungers are loosely assembled as a unit for entry into said mold cavities, said press comprising a fixed platen and mold assembly actuating means between which said assembly is inserted, said assembly actuating means comprising a spring actuated rod for individually applying pressure to each mold plunger and forcing said mold plate against said fixed abutment, and means for retracting said spring actuated rods to release said mold assembly for removal from said press.

8. In an apparatus for molding and curing plastic materials comprising a curing oven having a bottom floor, said floor having an opening therein for the reception of a portion of a press vertically movable from an upper position within said oven to a lower position without said oven, said press comprising an upper fixed platen and a lower movable platen, said upper platen being adapted to fit into said opening in said lower position, and said lower platen being adapted to fit into said opening in said upper position, a removable mold assembly inserted between said platens, said assembly comprising a mold plate having a plurality of cavities therein, a plurality of individually spring actuated push rods extending through said movable platen for actuating said plungers and said mold plate against said fixed platen, and means for actuating said movable platen to withdraw said push rods to release said mold assembly for removal from said mold.

References Cited in the file of this patent
UNITED STATES PATENTS

| | | |
|---|---|---|
| 1,641,923 | Davis | Sept. 6, 1927 |
| 1,738,046 | Elton et al. | Dec. 3, 1929 |
| 1,807,443 | Senn | May 26, 1931 |
| 2,013,368 | Trusler | Sept. 3, 1935 |
| 2,381,272 | Fischer | Aug. 7, 1945 |
| 2,619,341 | Wallerius | Nov. 25, 1952 |
| 2,981,976 | Maier | May 2, 1961 |